United States Patent
Thompson

(10) Patent No.: US 9,321,365 B2
(45) Date of Patent: Apr. 26, 2016

(54) VARIABLE GAIN REFERENCE ANTENNA FOR NON-CONTACT CHARGING DEVICE

(71) Applicant: DELPHI TECHNOLOGIES, INC., Troy, MI (US)

(72) Inventor: Gary R. Thompson, Youngstown, OH (US)

(73) Assignee: Delphi Technologies, Inc., Troy, MI (US)

(*) Notice: Subject to any disclaimer, the term of this patent is extended or adjusted under 35 U.S.C. 154(b) by 208 days.

(21) Appl. No.: 14/269,701

(22) Filed: May 5, 2014

(65) Prior Publication Data

US 2015/0314688 A1    Nov. 5, 2015

(51) Int. Cl.
| | |
|---|---|
| *H01M 10/46* | (2006.01) |
| *B60L 11/18* | (2006.01) |
| *H02J 7/00* | (2006.01) |
| *B60L 3/04* | (2006.01) |
| *H02J 7/02* | (2016.01) |

(52) U.S. Cl.
CPC ............... *B60L 11/182* (2013.01); *B60L 3/04* (2013.01); *B60L 11/1824* (2013.01); *B60L 11/1829* (2013.01); *H02J 7/0047* (2013.01); *H02J 7/025* (2013.01)

(58) Field of Classification Search
CPC ......... H02J 5/005; H02J 7/025; H02J 7/0042; H02J 7/355

USPC ............................ 320/104, 108; 307/9.1, 104
See application file for complete search history.

(56) References Cited

U.S. PATENT DOCUMENTS

| | | | |
|---|---|---|---|
| 2012/0112531 A1* | 5/2012 | Kesler | B60L 11/182 307/9.1 |
| 2012/0181875 A1 | 7/2012 | Wechlin et al. | |
| 2012/0262002 A1 | 10/2012 | Widmer et al. | |
| 2014/0145514 A1* | 5/2014 | Konno | B60L 11/182 307/104 |
| 2014/0339908 A1* | 11/2014 | Omae | H01F 38/14 307/104 |

FOREIGN PATENT DOCUMENTS

| | | |
|---|---|---|
| JP | 2006 060909 A | 3/2006 |
| WO | 2013/189530 A1 | 12/2013 |
| WO | 2015/096997 A1 | 7/2015 |

* cited by examiner

*Primary Examiner* — Edward Tso
(74) *Attorney, Agent, or Firm* — Lawrence D. Hazelton

(57) ABSTRACT

A non-contact charging device for charging a battery includes a source resonator, a reference antenna, and a variable gain amplifier. The source resonator is configured to transfer electrical energy to a capture resonator in a vehicle. The reference antenna is configured to detect a reference signal originating from the source resonator. The reference antenna is configured to be less sensitive to a presence of a foreign object than a foreign object detection (FOD) antenna proximate to the reference antenna. The variable gain amplifier is configured to amplify a reference signal from the reference antenna.

4 Claims, 2 Drawing Sheets

VARIABLE GAIN REFERENCE ANTENNA FOR NON-CONTACT CHARGING DEVICE

TECHNICAL FIELD OF INVENTION

This disclosure generally relates to a non-contact charging device, and more particularly relates to a equipping the device with a variable gain amplifier to amplify a reference signal from a reference antenna of the device.

BACKGROUND OF INVENTION

Non-contact or wireless charging systems for electric vehicles or hybrid-electric vehicles have been proposed. Such systems are convenient for charging the vehicles as it is not necessary to manually attach or insert a charging device into the vehicle. Electromagnetic energy is transmitted or communicated from a source resonator typically located in a base unit on a parking surface under the vehicle to a capture resonator attached to the vehicle and typically located on the underside of the vehicle. Because there is the potential for electromagnetic energy to be coupled to unexpected foreign objects proximate to the source resonator and capture resonator, tools, toys, or pets for example, it is advantageous to provide a means to detect such foreign objects.

SUMMARY OF THE INVENTION

In accordance with one embodiment, a non-contact charging device for charging a battery in a vehicle is provided. The device includes a source resonator, and a foreign object detector. The source resonator is configured to transfer electrical energy to a capture resonator in a vehicle. The foreign object detector is configured to detect a foreign object proximate to the source resonator. The foreign object detector includes a vertical antenna configured to detect a foreign object above the source resonator, and a horizontal antenna configured to detect a foreign object beside the source resonator.

In another embodiment, a non-contact charging device for charging a battery in a vehicle is provided. The device includes a source resonator, a reference antenna, and a variable gain amplifier. The source resonator is configured to transfer electrical energy to a capture resonator in a vehicle. The reference antenna is configured to detect a reference signal originating from the source resonator. The reference antenna is configured to be less sensitive to a presence of a foreign object than a foreign object detection (FOD) antenna proximate to the reference antenna. The variable gain amplifier is configured to amplify a reference signal from the reference antenna.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
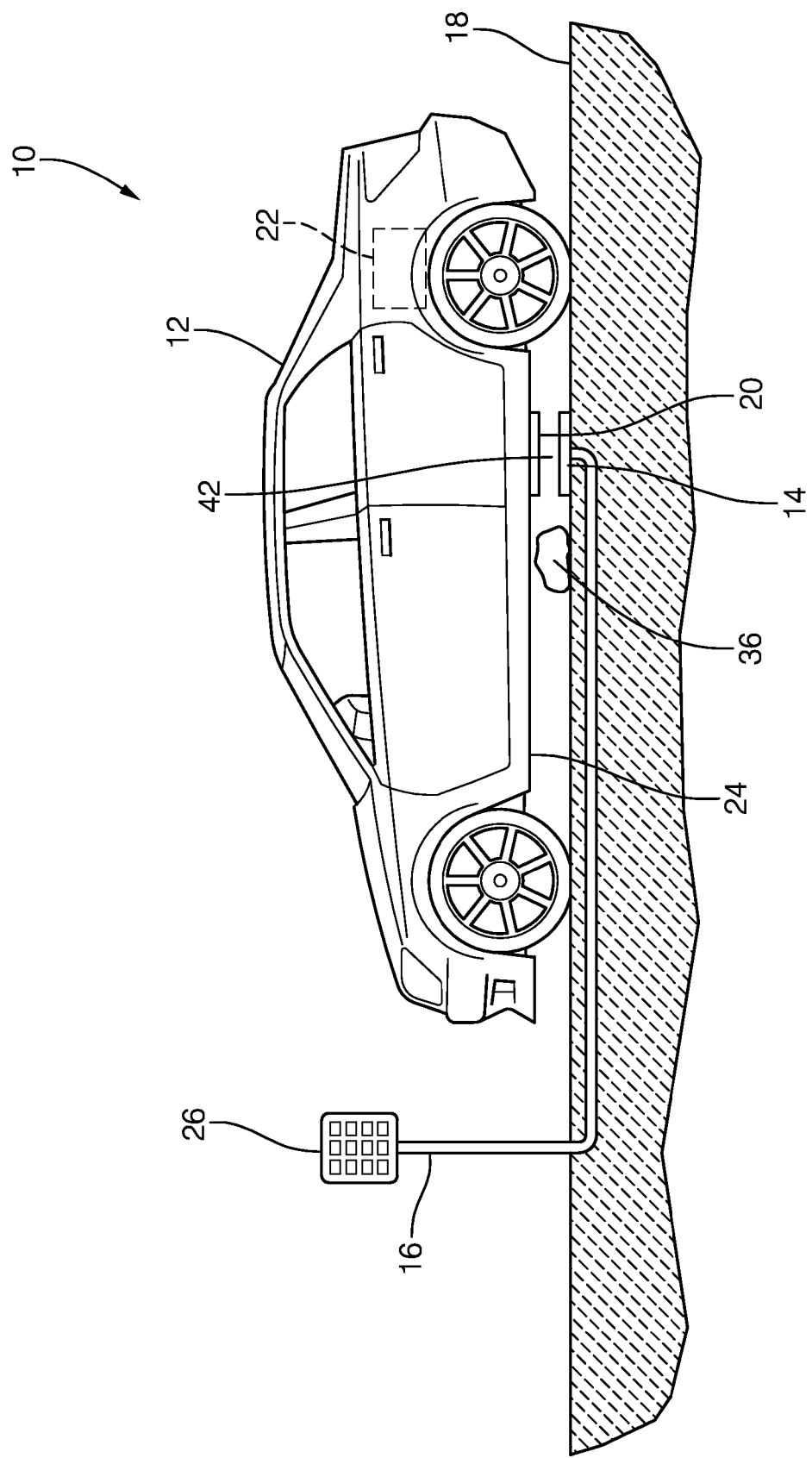
FIG. 1 is a side a non-contact charging system and device for charging a battery in a vehicle in accordance with one embodiment.

FIG. 1 illustrates a non-limiting example of a vehicle charging system, hereafter referred to as the system 10, for charging a battery 22 in a vehicle 12. The system 10 generally includes a non-contact charging device, hereafter the device 16, which typically includes a base unit 14 located on a parking surface 18 such as a garage floor under the vehicle 12. The device 16 is generally configured to transfer electrical energy from the base unit 14 to a capture resonator 20 located on the underside 24 of the vehicle 12. The device 16 may include a control panel 26 configured to, for example, indicate when the capture resonator is centered over the base unit 14, and indicate a state of charge of the battery 22, and regulate electrical energy delivered to the base unit 14.

Figure 2:
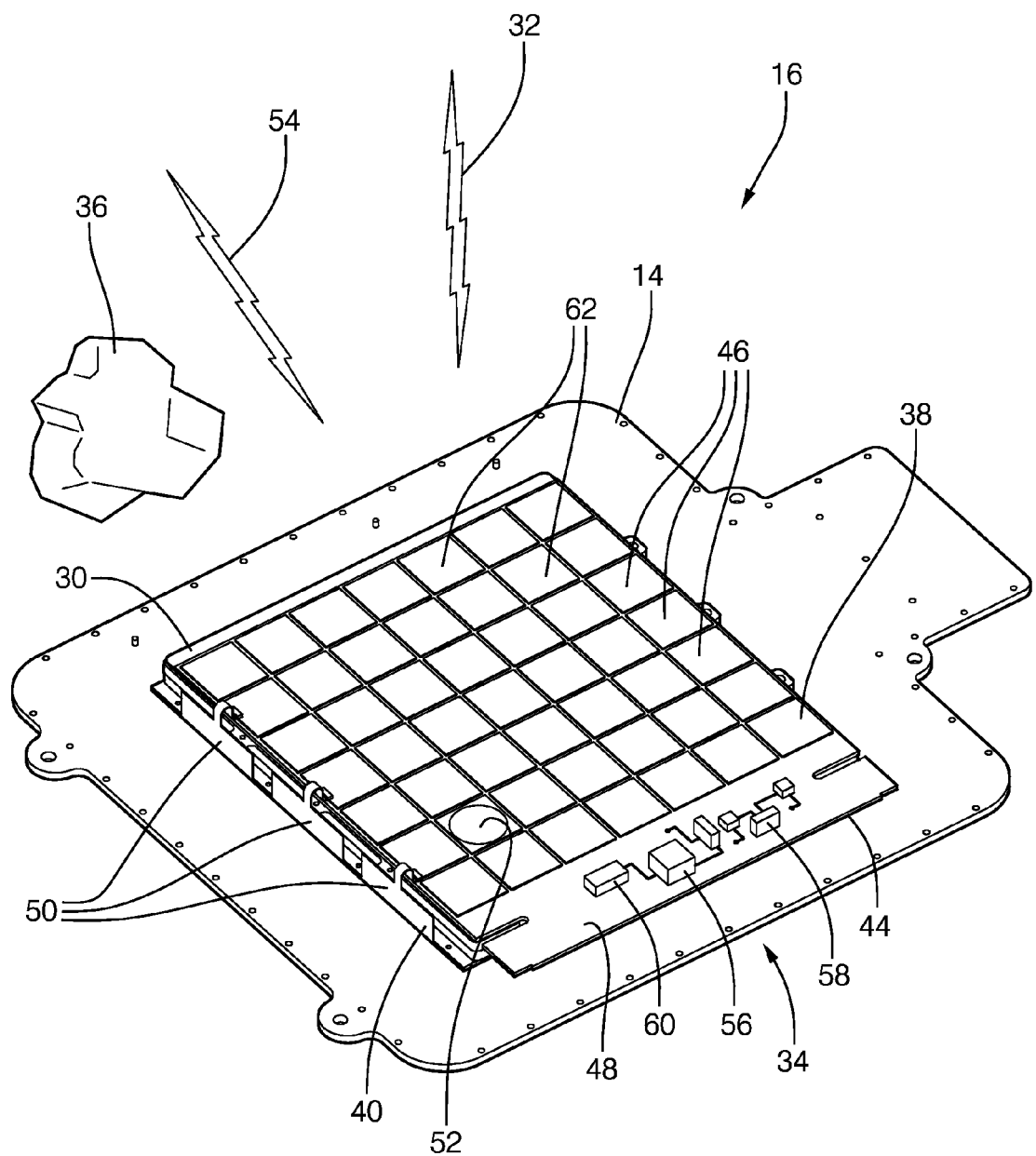
FIG. 2 is perspective view of the device of FIG. 1 in accordance with one embodiment.

FIG. 2 illustrates a non-limiting example of the base unit 14. The base unit 14 normally includes a protective cover which is not shown only to simplify the illustration. The base unit 14 generally includes a source resonator 30 configured to emit the electromagnetic energy 32 toward the capture resonator 20 (FIG. 1). It is believed to be undesirable to couple or expose certain objects to the electromagnetic energy 32, so the device 16 is equipped with a foreign object detector 34 configured to detect a foreign object 36 proximate to the source resonator 30.

In this non-limiting example, the foreign object detector 34 includes a vertical antenna 38 configured to detect a foreign object above the source resonator 30, for example, between the source resonator 30 and the capture resonator 20. It has been observed that some of the electromagnetic energy 32 may travel or be emitted beyond the gap area 42 defined by the source resonator 30 on the bottom and the capture resonator 20 on the top, so the device 16 may advantageously also include a horizontal antenna 40 configured to detect a foreign object (e.g. the foreign object 36) located beside the source resonator 30, i.e. outside of the gap area 42. In general, the vertical antenna 38 preferentially detects electromagnetic energy originating or reflecting from a direction above the base unit and towards the capture resonator 20, while the horizontal antenna 40 preferentially detects electromagnetic energy originating or reflecting from a direction characterized as being in a radial or horizontal direction away from the base unit 14.

By way of example and not limitation, the vertical antenna 38 may be arranged upon a substrate 44 or circuit board assembly of the device 16. The vertical antenna 38 may be advantageously located and within a perimeter of the substrate 44 where the perimeter of the substrate is generally determined by the shape of the source resonator. Such a configuration allows for the vertical antenna 38 to be better directed to detect a foreign object in the gap area 42. In contrast, the horizontal antenna 40 may be coupled to the perimeter, but be configured to 'reach' over the source resonator 30 and be oriented in a direction that is characterized as being perpendicular to the vertical antenna. Such a configuration allows for the horizontal antenna 40 to be better directed to detect a foreign object lying on the parking surface 18 outside of the gap area 42.

By way of further example, the vertical antenna 38 may include an array of vertically directed elements 46. With such a configuration, the sensitivity and focus of the vertical antenna 38 can be varied in order better estimate the size, composition, and/or location of an object in the gap area 42. In order to do this, the substrate 44 may include or define an electrical components are 48 where various electrical components (not shown) known to those in the art can be connected to electrical traces (not shown) on the substrate 44 and thereby form, for example, a controller or processor of the foreign object detector 34. Likewise, the horizontal antenna 40 may include a plurality of horizontally directed elements 50, the functional combination of which can be varied in order better estimate the size, composition, and/or location of an object outside of the gap area 42.

As described above, the non-contact charging device (the device 16) for charging the battery 22 in the vehicle 12 generally includes a source resonator 30 configured to transfer electrical energy (i.e. the electromagnetic energy) to the capture resonator 20 in the vehicle 12. In order to determine an amount of the electromagnetic energy that is being emitted, the base unit 14 of the device 16 may include a reference antenna 52 configured to detect a reference signal 54 originating from the source resonator 30. It is possible that one of the array of vertically directed elements 46 could serve as a reference antenna. However, it has been observed that a reference antenna that is smaller than the typical vertical element is advantageous as a reduced size reference antenna is less sensitive to the presence of a foreign object if one is present. That is, it is preferable for the reference antenna 52 to have a sensitivity characteristic to the presence of a foreign object that would be considered undesirable for use as one of the vertical elements. As such, the reference antenna 52 is preferably less sensitive to the presence of the foreign object 36 than a foreign object detection (FOD) antenna (e.g. the vertical antenna and/or the horizontal antenna 40) proximate to the reference antenna 52.

Since using a smaller antenna for the reference antenna 52 means that the reference antenna 52 will be less sensitive, and that the reference antenna may be used when the device is in a standby mode. The standby mode is when the device 16 is not charging the battery 22, but is 'looking' for the vehicle to arrive and bring the capture resonator close to the base unit 14 so charging can be initiated. In the standby mode the source resonator 30 may be operated to emit a relatively low amount of energy in order to allow detection of an approaching vehicle.

Because of the reduced signal from the reference antenna 52, the substrate 44 may advantageously include a variable gain amplifier, hereafter the amplifier 56, configured to amplify the reference signal 54 detected by or output from the reference antenna 52. By providing variable gain, the level of the signal from the reference antenna 52 can be boosted to be better analyzed by the controller or processor of the foreign object detector 34.

Accordingly, the amplifier 56 may operate at a first selected gain when the device 16 is charging a battery 22 in the vehicle 12 so the signal detected by the reference antenna is relatively strong, and operate at a second selected gain greater than the first selected gain when the device is not charging a battery in the vehicle because the signal detected by the reference antenna 52 is relatively weak. The gain of the amplifier 56 may be determined by a resistor value in a feedback loop of the antenna, as will be recognized by those in the art. As such, it may be advantageous if the amplifier 56 includes a resistor network 58 operable to determine the gain of the amplifier 56 to a plurality of gain values. For example, the values of the various resistors in the resistor network 58 may be individually adjusted during a calibration procedure of the device 16 in order to compensate for normal variations in other features of the device 16 that may influence the strength of signal output by the reference antenna 52.

The device 16 may also include a plurality of reference antennas 62 arranged across the substrate 44, and a switching device 60 configured to selectively connect one or more of the plurality of reference antennas 62 to the amplifier 56. Having a selection of what is used as a reference antenna can be used advantageously to self-diagnose the device 16 and to better detect small foreign objects while operating in the standby mode.

Accordingly, a system 10, and a device 16 for charging a battery in a vehicle is provided. The device 16 includes a vertical antenna 38 and a horizontal antenna 40 so foreign objects can be readily detect in many possible direction, and a variable gain amplifier (the amplifier 56) so the reference antenna 52 can be better optimized for monitoring a reference signal output by the source resonator 30.

While this invention has been described in terms of the preferred embodiments thereof, it is not intended to be so limited, but rather only to the extent set forth in the claims that follow.

I claim:

1. A non-contact charging device for charging a battery in a vehicle, said device comprising:
    a source resonator configured to transfer electrical energy to a capture resonator in a vehicle;
    a reference antenna configured to detect a reference signal originating from the source resonator, wherein said reference antenna is configured to be less sensitive to a presence of a foreign object than a foreign object detection (FOD) antenna proximate to the reference antenna; and
    a variable gain amplifier configured to amplify a reference signal from the reference antenna.

2. The device in accordance with claim 1, wherein the amplifier operates at a first selected gain when the device is charging a battery in the vehicle, and a second selected gain greater than the first selected gain when the device is not charging a battery in the vehicle.

3. The device in accordance with claim 1, wherein the amplifier includes a resistor network operable to determine the gain of the amplifier to a plurality of gain values.

4. The device in accordance with claim 1, wherein the device includes a plurality of reference antenna and a switching device configured to selectively connect one or more of the plurality of reference antenna to the amplifier.

* * * * *